US012782179B2

(12) United States Patent
Zbinden et al.

(10) Patent No.: US 12,782,179 B2
(45) Date of Patent: Nov. 3, 2026

(54) FLOW METER

(71) Applicant: GWF AG, Lucerne (CH)

(72) Inventors: Matthias Zbinden, Magden (CH); Trung Dung Luong, Kriens (CH); Hoang-ha Nguyen, Hanoi (VN); Sergio Thaddey, Adligenswil (CH); Markus Helfenstein, Lucerne (CH)

(73) Assignee: GWF AG, Lucerne (CH)

( * ) Notice: Subject to any disclaimer, the term of this patent is extended or adjusted under 35 U.S.C. 154(b) by 263 days.

(21) Appl. No.: 18/747,073

(22) Filed: Jun. 18, 2024

(65) Prior Publication Data

US 2025/0334435 A1 Oct. 30, 2025

(30) Foreign Application Priority Data

Apr. 29, 2024 (EP) ..................................... 24173106

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
CPC ........... G01F 1/662; G01F 1/667; G01F 15/14
See application file for complete search history.

(56) References Cited

U.S. PATENT DOCUMENTS

| | | | |
|---|---|---|---|
| 7,469,599 B2 | 12/2008 | Froehlich et al. | |
| 8,424,392 B2 | 4/2013 | Kroemer et al. | |
| 8,516,901 B2 | 8/2013 | Kroemer et al. | |
| 10,359,305 B2 | 7/2019 | Drachmann | |
| 10,704,941 B2 | 7/2020 | Kuhlemann et al. | |
| 2011/0154913 A1* | 6/2011 | Konyukhov | G01F 1/3266 73/861.24 |
| 2019/0226892 A1* | 7/2019 | Kuhlemann | G01F 15/18 |
| 2023/0375386 A1 | 11/2023 | Helfenstein et al. | |

FOREIGN PATENT DOCUMENTS

| | | |
|---|---|---|
| CN | 216385833 | 4/2022 |
| CN | 219776809 | 9/2023 |
| DE | 199 44 411 | 4/2001 |
| DE | 101 20 355 | 10/2002 |
| DE | 10 2005 057 888 | 6/2007 |
| DE | 20 2016 008 775 | 8/2019 |
| EP | 0 897 101 | 11/2005 |
| EP | 0 890 826 | 11/2009 |
| EP | 2 888 560 | 7/2015 |
| EP | 2 386 836 | 1/2016 |
| EP | 2 306 160 | 8/2017 |
| EP | 1 544 582 | 10/2017 |

(Continued)

OTHER PUBLICATIONS

German Search Report dated Sep. 21, 2023 from German Application No. 10 2023 102 441.8.

(Continued)

*Primary Examiner* — Fatemeh Esfandiari Nia

(74) *Attorney, Agent, or Firm* — Beyer Law Group LLP

(57) ABSTRACT

This disclosure relates to a flow meter (1) comprising a measuring channel insert (28) which is placed in a flow channel body (2) in the radial direction, an inlet insert (24) and/or an outlet insert (26) being placed in advance in the axial direction.

16 Claims, 10 Drawing Sheets

(56) References Cited

FOREIGN PATENT DOCUMENTS

| | | | | |
|---|---|---|---|---|
| EP | 3 401 649 | | 11/2018 | |
| EP | 3 172 539 | | 8/2022 | |
| WO | WO 2004/036151 | | 4/2004 | |
| WO | WO 2016/012024 | | 1/2016 | |
| WO | WO 2018/011371 | | 1/2018 | |
| WO | WO 2018/011372 | | 1/2018 | |
| WO | WO 2022/079213 | | 4/2022 | |
| WO | WO 2022/079214 | | 4/2022 | |
| WO | WO-2022079214 | A1 * | 4/2022 | ............. G01F 1/662 |
| WO | WO-2023238875 | A1 * | 12/2023 | ............. G01F 15/08 |

OTHER PUBLICATIONS

Extended European Search Report dated Oct. 11, 2024 from European Application No. 24 173 106.6.

* cited by examiner

FLOW METER

CROSS-REFERENCE TO RELATED APPLICATIONS

This application claims priority of EP Application No. 24 173 106.6, filed on Apr. 29, 2024, which is incorporated by reference herein in its entirety.

DESCRIPTION

The invention relates to a flow meter for measuring the flow rate of fluids in a pipeline or the like according to the preamble part of claim 1.

Flow meters can, for example, have two ultrasonic transducers which are attached to a pipe section of the pipeline at a distance from each other as a so-called “clip-on solution”, with both transducers acting as transmitter and receiver. The measurement signals are coupled into the fluid at an angle through the pipe section wall.

The flow rate can then be determined in a known manner from the transit time of the measuring signals from the transmitter to the receiver. Such flow meters are described, for example, in the printed documents WO 2004/036151 A1 and DE 10 2005 057 888.

A disadvantage of clip-on flow meters is that the measuring signals pass through the wall of the measuring channel, so that different measuring signals are obtained with different materials from which the measuring channel may be made, so that the influence of the material must be taken into account when evaluating the measuring signal.

Solutions which have a measuring insert in which the ultrasonic transducers are accommodated are also known. This measuring insert is inserted into a recess of a pipe section/measuring channel, with the possibility that the actual measuring channel is also part of this measuring insert.

Such a solution is disclosed, for example, in DE 101 20 355 A1, wherein the two ultrasonic transducers are arranged at a distance from each other in the flow direction and on opposite sides of the measuring channel.

EP 2 306 160 A1 discloses a flow meter/flow counter in which the measuring insert both accommodates the ultrasonic transducers and forms the actual measuring channel. This measuring insert is fixed to a tangentially extending flange of a pipe section of a housing of the flow meter. A profile body forming the measuring channel, which has an influence on the flow within the measuring area and on which reflectors for the measuring signals are also provided, enters a recess of the pipe section embraced by the flange. In this solution, the two ultrasonic transducers are arranged in a pot-shaped housing part of the measuring insert, which is closed toward the flow and is submerged in it.

A similar solution is shown in EP 2 386 836 B1. In this exemplary embodiment, the measuring insert carries two ultrasonic transducers arranged offset to each other in the flow direction, which are also accommodated in a pot-shaped housing part and protrude into the measuring channel through an opening of a pipe section of a housing surrounded by a flange. The flow guidance within the measuring channel is determined by a housing insert that can be inserted from the end face of the housing, which also carries reflectors for the ultrasonic signals, so that the ultrasound is emitted from one of the ultrasonic transducers and reflected via the reflectors to the other ultrasonic transducer, which is located downstream, for instance. Of course, the signal can also be routed in the opposite direction.

In the publication EP 0 890 826 B1, a flow meter is described in which a measuring insert is attached to a tangentially extending flange, here also in the area of a pipe section of a housing. The measuring insert carries two ultrasonic transducers, which are inserted into recesses in the base of a housing section and are each sealed there by means of a seal. The entire measuring insert is then sealed against the flange with a further circumferential seal that surrounds both ultrasonic transducers. Also in this exemplary embodiment, the measuring channel is formed by a measuring insert, which is inserted into the pipe section of the housing through the recess surrounded by the flange. One insert each is provided on the inlet and outlet side of this flow meter, which are inserted into corresponding seatings of the flow meter housing and rest against radial shoulders of the housing on the end face.

The publication DE 199 44 411 A1 discloses a flow meter in which an insert is provided in a measuring tube, through which the cross-section of the measuring tube is formed so as to be elongated. Two ultrasonic transducers are arranged offset in the flow direction on the opposite sides of the measuring channel.

The publications DE 20 2016 008 775 U1 and WO 2016/012 024 A1 and EP 3 172 539 B1 each disclose flow meters in which a measuring channel is formed by an approximately cylindrical insert that is inserted axially into the pipe section of the housing.

Flow meters in which a measuring insert is pushed into a measuring channel in the axial direction have the disadvantage that these measuring inserts are very limited in terms of geometry, since axial insertion requires that the measuring insert and the measuring channel are formed without any undercuts. In addition, tapered designs in the inlet and outlet area are difficult to realize or at best only possible with considerable wall thickness of the measuring insert.

Document WO 2018/011 371 A1, which can be traced back to the applicant, describes a flow meter in which the input and output of measurement signals from two measurement sensors that are spaced apart from each other are coupled via a common or a respective coupling piece that carries the sensor(s)/transducer(s).

In the parallel patent application WO 2018/011 372 A1, a flow meter with an oval or trapezoidal measuring channel is described.

Both flow meter concepts ensure an improved flow through the flow meter compared to the aforementioned prior art with improved measuring accuracy. In one exemplary embodiment of these flow meters, it is also provided to arranged inserts on the inlet and outlet side, via which the fluid connection to or from the measuring channel is predefined. These inserts are in turn inserted in a housing of the flow meter.

The applicant’s publication WO 2022/079 213 A1 discloses a further development of the concept described above, in which the inserts are first inserted in the radial direction through a recess of the flow channel and then moved in axial direction to their predetermined end position. Subsequently, a multi-part measuring channel insert is inserted through the recess also in radial direction so that it is positioned in the area between the inserts.

Such a concept can be used very advantageously with comparatively small nominal widths. With larger nominal widths, a problem can arise in that a comparatively large volume must be provided to receive the radially inserted inserts and the multi-part measuring channel housing in the flow channel.

EP 2 888 560 A1 describes a flow meter in which the two ultrasonic sensors are also arranged in a closed housing that enters a measuring channel through a radial recess. These submerged areas in turn interfere with the flow through the measuring channel. Furthermore, these areas of the housing that are submerged in the inside of the measuring channel serve to fix a measuring insert placed in the measuring channel. This measuring insert carries reflectors to deflect the measuring beams. Similar to the solutions described above, the measuring channel and the measuring insert must be matched to each other such that the axial, end-face insertion of the measuring insert is made possible.

European patent EP 1 544 582 B1 relates to a flow meter in which a measuring insert is also inserted into a measuring channel in the axial direction. Furthermore, it is assumed that the cross-section of the measuring channel is hexagonal, octagonal or essentially has the shape of a square with rounded corners. Such a measuring insert can only be realized with considerable technical effort.

Further prior art relating to the technical field described above is known from CN 2 16 385 833 U.

In contrast, the invention is based on the task of further developing the flow meter with a view to further reducing the assembly and device-related effort while achieving optimum measuring accuracy.

This task is solved by a flow meter comprising the features of claim 1.

Advantageous further embodiments of the invention are subject matter of the subclaims.

The flow meter according to the invention has a flow channel body—hereinafter referred to as "body"—on which a measuring unit is held. The latter has at least two spaced-apart sensors which are designed, for example, as ultrasonic transducers. Their measurement signals are coupled in or out through at least one recess of the body. Furthermore, the flow meter has a control unit accommodated in a control housing for driving the sensors and for processing these measurement signals, wherein a measuring channel is formed in the body at least in sections by a measuring channel insert which at least partially delimits a measuring channel section and which is inserted through said recess in the radial direction. The flow meter according to the invention is further designed with an inlet insert and an outlet insert, which are inserted through a fluid inlet and fluid outlet of the body, respectively, these inserts being designed in such a way that they are fixed in position by the subsequent insertion of the measuring channel insert in the body and preferably rest against a stop wall of the body.

With such a concept, in which the inserts are inserted in the axial direction and the measuring channel insert is inserted in the radial direction and, in addition, the inserts are fixed in position in the body by inserting the measuring channel insert, the flow meter can be designed so as to have a very small construction volume, whereby the assembly can be carried out very easily and with high precision by fixing the inserts in position via the measuring channel insert.

In a preferred exemplary embodiment of the invention, the stop wall is formed by at least one radial step of a channel of the body, through which the clear width of the channel for receiving the measuring channel insert is reduced. Accordingly, the outer diameter of the insert in this area is larger than the clear width of the channel due to such a design.

In one variant of the invention, the insert is designed with a hollow main body, the inner circumference of which delimits a flow cross-section which is designed on the measuring channel insert side approximately as an elongated or rounded, in the broadest sense rectangular profile, with a locking hook projecting from the main body on the end face towards the measuring channel insert, a fixation rib of the measuring channel insert engaging behind said locking hook for fixing the position. It is particularly preferable here if the locking hook is supported at the rear by a groove wall. Due to the fact that each insert is engaged and supported from the rear, they are each fixed in radial and axial direction, so that very precise relative positioning of the measuring channel insert with respect to the two inserts is ensured.

It is particularly advantageous if the main body is tapered in sections towards the measuring channel insert, so that the preferably elongated front face on the measuring channel insert side is smaller than the approximately circular front face of the main body spaced therefrom.

The manufacture of the insert and its stability is further optimized if the locking hook is formed in the area of a side piece projecting at the front face from the main body, which is preferably cut free by a side piece groove.

The locking of the insert is particularly precise if a locking surface is provided on the locking hook that is set at an angle to the radial direction and is in operative engagement with a corresponding inclined surface of the fixing lug.

The locking of the inserts is further simplified if the locking hook is arranged below a center plane of the insert or the measuring channel in the direction of insertion of the measuring channel insert.

Advantageously, side piecing areas can be reinforced by ribs or the like.

The support of the inserts is further improved if the front face on the measuring channel insert side is inclined in such a way that the length of the insert on the measuring channel insert side is less than its axial length.

In a preferred exemplary embodiment of the invention, the measuring channel insert is designed in several parts with, for example, a measuring channel upper section and a measuring channel lower section, with the measuring channel upper section and the measuring channel lower section preferably being attached to a base of the control housing and together with the base delimiting the measuring channel section circumferentially.

The production of such a measuring channel insert is particularly simple if at least one reflector is held on the measuring channel upper section and/or on the measuring channel lower section, preferably in an integrally bonded manner. This material connection can be made by injection molding or ultrasonic welding, for example.

The assembly of the flow meter is further simplified if the measuring channel upper section, the measuring channel lower section and preferably at least part of the control housing are integrally bonded before radial insertion into the body. This material connection can also be achieved by injection molding or ultrasonic welding, gluing, etc.

The body, which is usually designed as a cast body, is particularly compact if parallel flattened areas are provided laterally in the area of the measuring channel section, the spacing of which is designed to correspond to the measuring channel profile.

As explained above, this measuring channel profile is preferably designed as an elongated or—preferably rounded—rectangular profile, with the longer axis extending in the radial direction, i.e. in the insertion direction of the measuring channel insert.

In one exemplary embodiment of the invention, the flow channel body and the measuring channel insert are positively positioned relative to each other with the control housing via fitting pieces, fitting recesses, a pin connection or a snap-fit connection.

It is particularly preferable here if the connection between the flow channel body and the measuring channel insert is achieved via two connecting pins arranged parallel to each other. These pins preferably extend approximately parallel to the flow direction of the flow meter.

In a preferred exemplary embodiment, at least two guide tabs, each assigned to a connecting pin, are formed on the flow channel body, into which the connecting pin can be inserted. On the measuring channel side, corresponding guides are formed, which run coaxially to the guide tabs 22 in the assembled state, so that the connecting pins engage alternately in the guide tabs and the guides and thus connect the components to each other.

These guide tabs are preferably formed on a flange of the flow channel body, wherein this flange surrounds the recess through which the measuring channel insert is inserted.

The manufacturing effort required to produce the flow channel body is minimal if retaining claws of the guide tabs do not completely surround a circumferential portion of the connecting pin but are open at the sides, facing away from the flow channel body.

In principle, these openings of the retaining claws can also—as disclosed in the prior art according to WO 2022/079214 A1—open inwards. However, tests have shown that the retaining claws/guide tabs that open outwards have a better ability to absorb the forces—that occur in the area of the connection between the measuring channel insert and the flow channel body in case of a flow through the flow meter—than is the case with the known solution.

The strength can be improved even further if the retaining claws completely surround the connecting pin along a circumferential portion-however, this requires greater manufacturing effort, especially if the flow channel body is made of cast metal.

The coupling and decoupling of the measurement signals is particularly easy if the sensors are attached to inclined support surfaces of the measuring channel upper section or the base of the control housing, with the possibility that the sensors are then fixed in position in an integrally bonded manner, preferably by gluing or pre-tensioning.

It is particularly preferable if each sensor is connected to a contact board, which in turn is connected to a main PCB via suitable lines.

Preferred exemplary embodiments of the invention are explained in more detail below with reference to schematic drawings in which.

Figure 1:
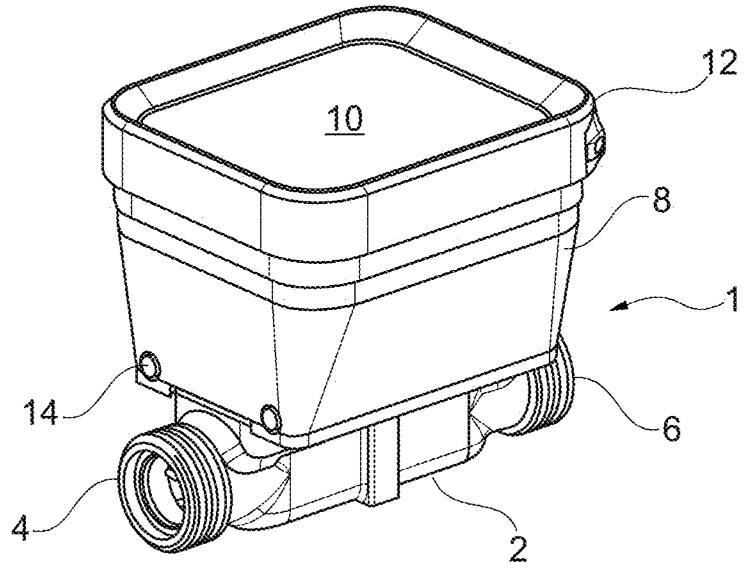
FIG. 1 is a three-dimensional illustration of a first exemplary embodiment of a flow meter according to the invention.

FIG. 1 shows a three-dimensional view of a first exemplary embodiment of a flow meter 1 according to the invention. The latter has a flow channel body 2, also called body, which can be connected to a pipeline via two connecting pieces 4, 6 in order to detect the volume flow or the flow velocity of the fluid flowing through this pipeline. The flow channel body 2—abbreviated to body 2 in the following—is usually made of a cast material, preferably brass. A control housing 8 is attached to the body 2, in which, as will be explained in more detail below, for example two sensors designed as ultrasonic transducers and the control electronics for driving these sensors and for evaluating the measurement signals from these sensors are arranged. In the view shown in FIG. 1, the control housing 8 is closed at the top by a glass cover 10, which covers an EDU (Electronic Display Unit). The glass cover 10 is attached to the control housing 8 via a clamping frame 12. As shown in FIG. 1, the connecting pieces 4, 6 are provided with an external thread, which enables a fluid-tight connection to the aforementioned pipeline. As will be explained in more detail below, the control housing 8 and other components of the flow meter 1 are connected to the body 2 via two connecting pins arranged in parallel. In the illustration according to FIG. 1, these connecting pins are covered by covers 14.

Figure 2:
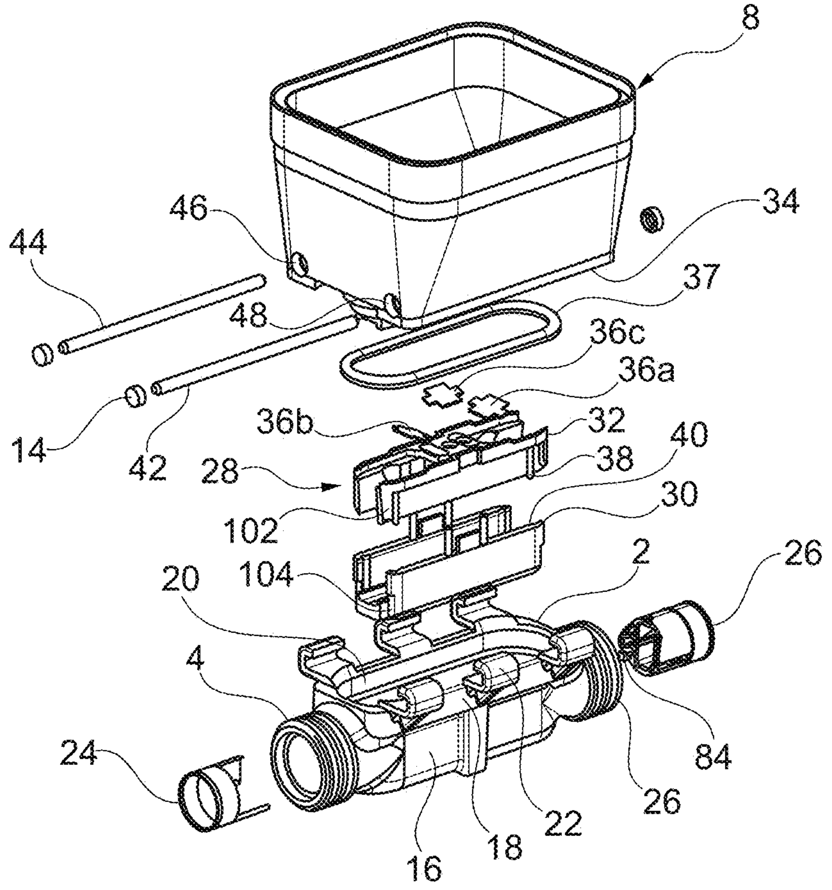
FIG. 2 is an exploded view of the flow meter according to FIG. 1.
Figure 3:
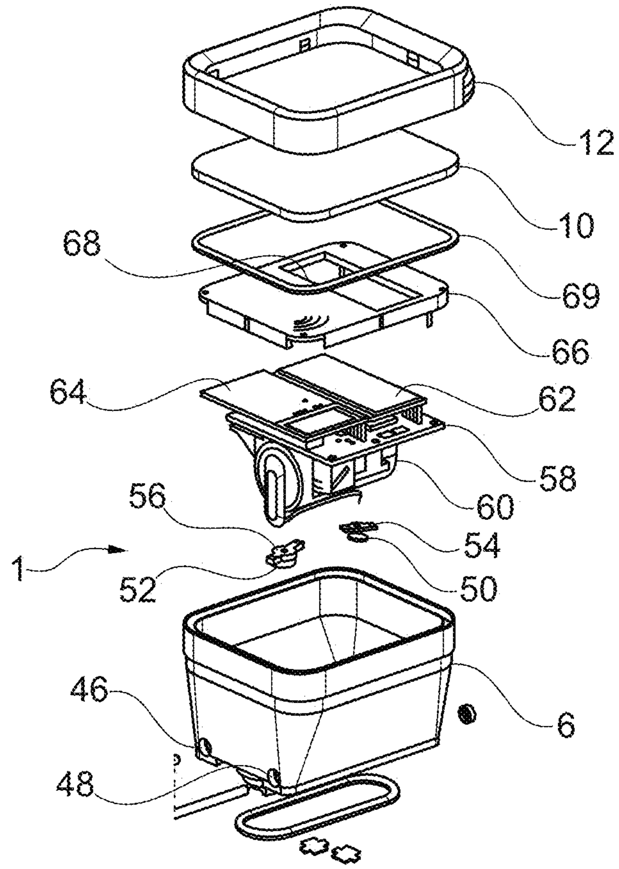
FIG. 3 is an exploded view of components accommodated in a control housing of the flow meter according to FIGS. 1 and 2.

FIG. 2 shows an exploded view of the flow meter 1, the components received in the control housing 8 being explained later with reference to FIG. 3.

According to the illustration in FIG. 2, the body 2, which is made of brass for example, has a channel housing 16, to the side end walls of which the two connecting pieces 4, 6 are attached. The channel housing 16 is designed with a flange 18 towards the control housing 8, which surrounds a recess 20 that extends in the area between the two connecting pieces 4, 6 and makes the inside of the channel housing 16 accessible. Six guide tabs 22 are provided on the flange 18 in the exemplary embodiment shown, into which the aforementioned connecting pins 42, 44 can be inserted. On the fluid inlet and fluid outlet side, an insert 24, 26 is inserted into each of the connecting pieces 4, 6, both of which have essentially the same structure, which is explained below with reference to FIG. 4.

The flow meter 1 according to the invention is also designed with a multi-part measuring channel insert 28, which is essentially formed by a measuring channel lower section 30, a measuring channel upper section 32 and a housing base 34 of the control housing 8. The basic structure of this measuring channel insert 28 and also of the control housing 8 is explained in the above-mentioned WO 2022/079 213 A1 of the applicant, so that only the elements essential for understanding the invention are described here and reference can otherwise be made to the disclosure of the above-mentioned publication.

In the exemplary embodiment shown, the measuring channel lower section 30, the measuring channel upper section 32 and the housing base 34 are joined together precisely and with high strength via suitable mating elements, so that in the assembled state a measuring channel with a defined cross-section and a predetermined profile with continuous transitions and essentially without pockets, undercuts or other obstacles is formed and enables measurements with optimum signal quality at high signal strength without signal noise and without interference. Accordingly, the flow meter according to the invention, which is explained in more detail below, is characterized by a very good gearing factor. This factor stands for the increase in flow rate in liters in a time difference T, and a high gearing factor means that a higher repeatability is obtained for a measurement than with a lower value, so that signal noise is reduced or at least compensated for at low flow velocities.

As explained below, two sensors are arranged in the control housing 8 in the exemplary embodiment shown, which are positioned at an angle to the axis of the measuring channel, whit their measurement signals being reflected via three reflectors 36 integrated into the measuring channel insert 28. Two of these reflectors 36*a*, 36*b* are accommodated in the measuring channel lower section 30. The third reflector 36*c* is positioned approximately in the center of the measuring channel upper section 32, resulting in a W-shaped signal path.

An O-ring seal 37 is provided for sealing between the measuring channel upper section 32/measuring channel lower section 30 on the one hand and the housing base 34 on the other. For assembly, the measuring channel lower section 30, the measuring channel upper section 32 and the control housing 8 are connected to one another along the housing base 34, whit the relative position being predefined via the aforementioned mating elements, of which two complementary mating elements 38, 40 are provided with a reference sign in FIG. 2 as an example.

In the exemplary embodiment shown, the reflectors 36 are preferably attached by inserting them into the tool during injection molding of the measuring channel lower sections 30 or the measuring channel upper sections 32 and thus encapsulating them. Of course, an integrally bonded connection can also be achieved by gluing or welding.

In principle, it is also possible to join the components of the measuring channel insert 28 in an integrally bonded manner by ultrasonic welding or the like. Production by injection molding is also possible, wherein a multi-stage injection molding process or multi-component injection molding is advantageous.

During assembly, the components of the measuring channel insert 28 assembled in the manner described above are inserted through the recess 20 in the radial direction, with the inserts 24, 26 first being inserted into the connecting pieces 4, 6 in a previous operation, so that the two inserts 24, 26 are fixed in position by the radial insertion of the measuring channel insert 28.

FIG. 2 shows the control housing 8 without the integrated components and without glass cover 10 and clamping frame 12. The two connecting pins 42, 44 can be seen, which are inserted into the guides 46, 48 of the housing base 34 and also extend through the guide tabs 22 coaxially disposed one behind the other, so that there is a perfectly fitting connection of the control housing 8 to the body 2. After inserting the connecting pins 42, 44, the covers 14 are then inserted into the guides 46, 48 so that these are closed off towards outside.

The components accommodated in the control housing 8 are explained with reference to FIG. 3. As explained above, the described exemplary embodiment of a flow meter 1 is realized with two sensors 50, 52, to each of which a contact board 54, 56 is assigned, which are connected to a main board 58 via suitable signal/power supply lines. The main board is part of the control electronics, which is supplied with energy via a battery 60 or another energy source, for example. In the exemplary embodiment shown, the EDU 62 including a display and a communication module 64, via which measurement signals can be forwarded to a central station or control signals can be received, are arranged on the upper side of the main board 58 visible in FIG. 3.

The communication module 64 and the EDU 62 are covered by a housing lid 66, which has a window 68 for reading out the display. The glass cover 10 is supported on the housing lid 66 via a further seal 69, wherein these components forming the housing closure are fixed in place via the clamping frame 12. This structure of the control housing 8 with the electronics integrated therein largely corresponds to the structure of the components described in WO 2022/079 213 A1.

Figure 4:
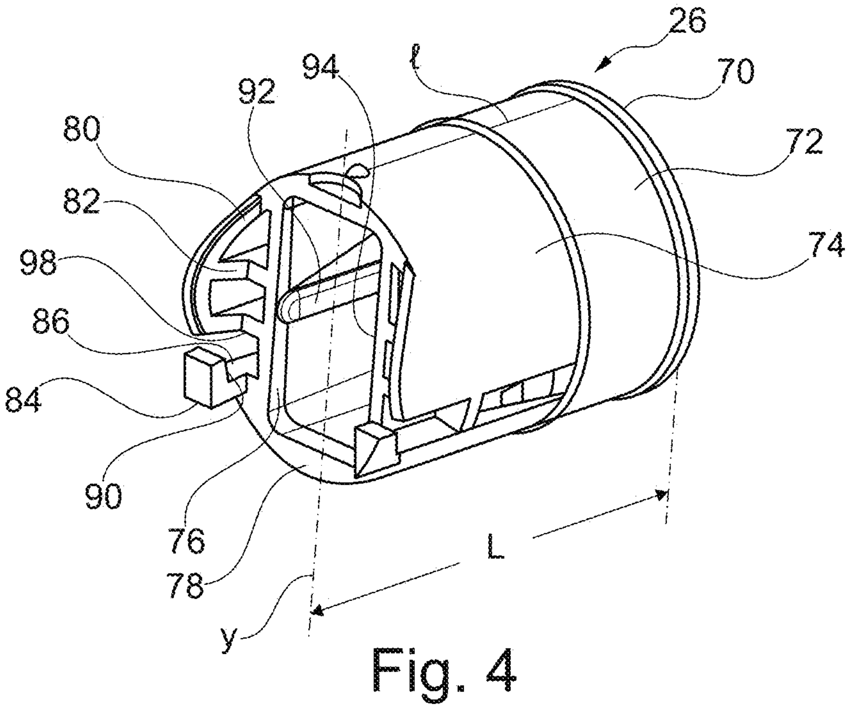
FIG. 4 is a detailed view of an insert from FIG. 2.

FIG. 4 shows an individual illustration of the outlet insert 26 on the outflow side, which in principle has the same structure as the inlet insert 24. Accordingly, the insert 26 has a main body 70, which has an approximately cylindrical shell portion 72, which is adjoined by a portion 74 converging towards the measuring channel insert 28, by means of which the circular flow cross-section in the area of the shell portion 72 is reduced to a narrowed cross-section, in the present case to an approximately rectangular cross-section, so that the flow velocity in the connecting piece 6 is reduced towards the fluid outlet. As mentioned, the profile 76 of the insert 26 on the measuring channel insert side is approximately rectangular in shape, with the longitudinal axis Y running approximately in the radial direction (i.e. approximately parallel to the insertion direction of the measuring channel insert 28). The front face 78, which is tapered relative to the rear front face of the main body 70, is slightly inclined relative to the vertical, so that the length 1 of the insert 26 on the upper side (view according to FIG. 4) is slightly less than the lower length L in FIG. 4, so that the axis Y of the profile 76 is correspondingly tilted/inclined to the right relative to the vertical in FIG. 4. This will be clarified later.

As explained above, the fluid flow entering the outlet insert 26 from the measuring channel insert 28 is slowed down by the widening of the flow cross-section and thus equalized. In the same way, the flow entering the flow meter 1 is accelerated by the inlet insert 24 tapering towards the measuring channel insert 28.

Approximately parallel to the vertical axis Y of the profile 76, a side piece 80 is formed on the front face 78, projecting from it approximately parallel to the axis, the front edge of which is rounded, as shown in FIG. 4. This side piece 80, which bulges slightly at the outer circumference, is supported on the tapered front face 78 via struts 82. A locking hook 84 is provided below the side piece 80 and also protrudes from the front face 78 in the direction toward the measuring channel insert 28. As can be seen in FIG. 4, the locking hook 84 has a base 86, from which a hook protrusion 88 projects approximately towards the side piece 80. This hook protrusion 88 is formed with an inclined locking surface 90, through which the hook protrusion 88 is tapered in the direction toward the side piece 80.

As can also be seen in FIG. 4, guiding ribs 92, 94 are provided in the interior of the inserts 24, 26, which contribute to flow equalization.

Figure 5:
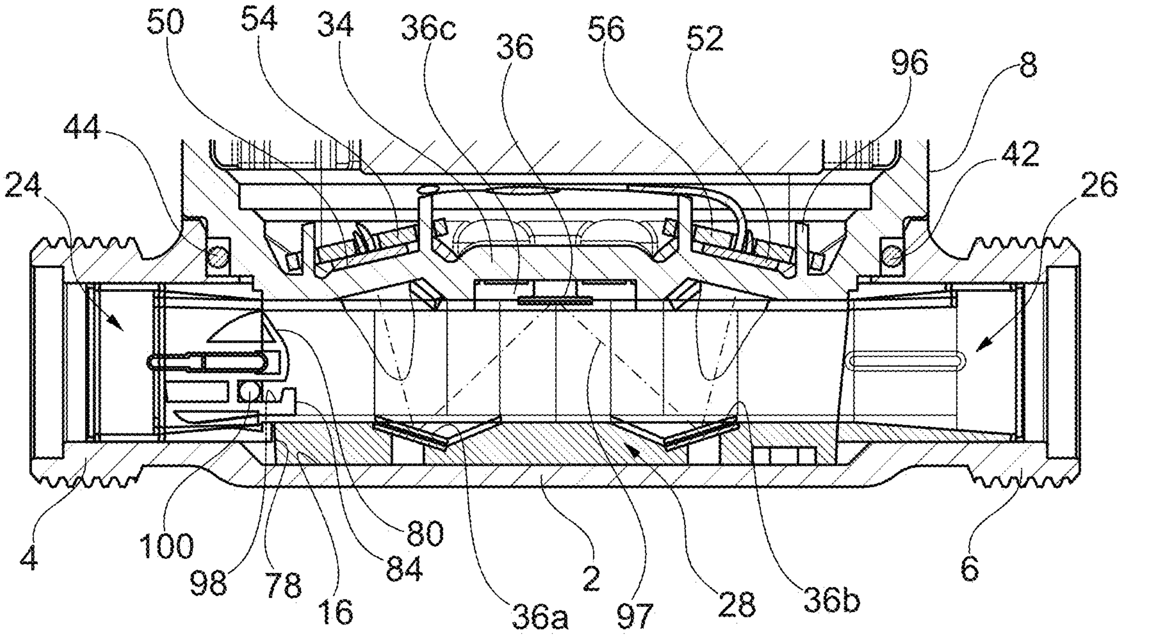
FIG. 5 is a simplified sectional view of the flow meter according to FIGS. 1 to 4.

FIG. 5 shows a sectioned partial illustration of the flow meter 1 with a part of the control housing 8, which is connected to the body 2 via the connecting pins 42, 44. The measuring channel insert 28 with the three reflectors 36*a*, 36*b*, 36*c* is inserted in the channel housing 16 in the radial direction. As explained, the two sensors 50, 52 and the associated contact boards 54, 56 are positioned on the housing base 34, which can be done via retaining pins 96 extending through the contact boards 54, 56. The sensors 50, 52 are connected to the contact boards 54, 56 in an integrally bonded manner. The inclined position of the sensors 50, 52 results in the W-shaped signal path 97 described above.

As explained above, the inlet insert 24 and outlet insert 26 are inserted into the connecting pieces 4 and 6, respectively. The locking hook 84, which protrudes laterally from the inclined front face 78 and is positioned at a distance below the side piece 80, can be seen in the illustration on the left. In this illustration it can also be seen quite clearly that the locking hook 84 is spaced from the side piece 80 by a side piece groove 98.

Figure 6:
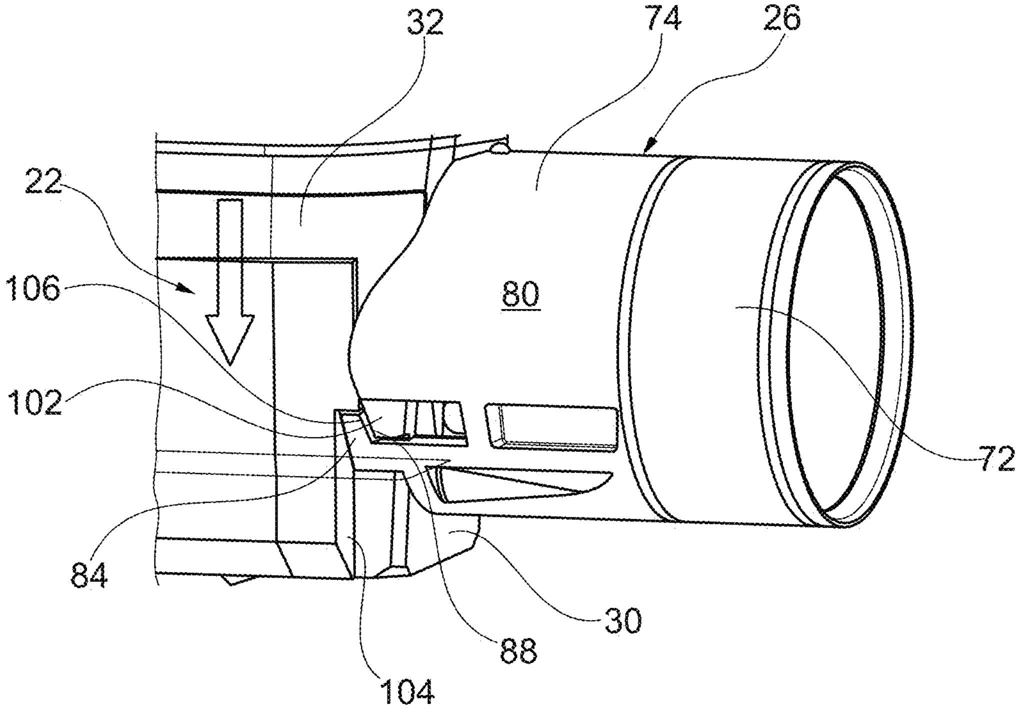
FIG. 6 is a three-dimensional illustration of the position of the insert of the flow meter according to FIGS. 1 to 5.

The inserts 24, 26 are fixed in position and locked by the measuring channel insert 28, which is inserted in the radial direction after the inserts 24, 26 have been pushed in axially. This positional fixing is explained with reference to FIG. 6, which only shows a part of the measuring channel insert 28 and the outlet insert 26 which is in locking engagement therewith. As explained, the two inserts 24, 26 are first inserted in the axial direction and then the multi-part measuring channel insert 28 is inserted through the recess 20 in the radial direction. As can also be seen in FIG. 2, the measuring channel upper section 32 connected to the measuring channel lower section 30 has laterally projecting fixation ribs 102 at the end sections pointing toward the inserts 24, 26, which, during the process of pushing in the measuring channel insert 28 (see direction of arrow in FIG. 7), move in inside the side piece 80 of the respective insert 26 and finally come into contact with the locking hook 84, so that the latter is engaged from behind by the fixation rib 102 and thus a reliable positional fixing is achieved in the axial and radial directions. As shown in FIG. 6, the locking surface 90 is in contact with an inclined surface 106 of the fixation rib 102. The axial position is additionally supported by the contact of the rear side of the hook protrusion 88 with a groove wall 104 of the measuring channel lower section 30.

The inlet insert 24 is locked in a corresponding manner.

Figure 7:
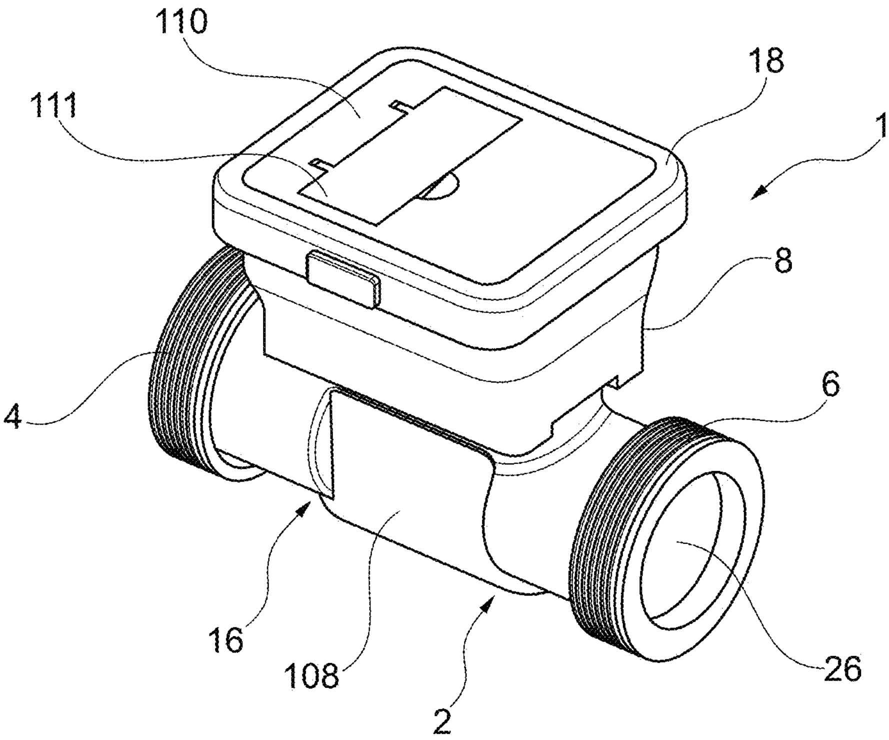
FIGS. 7 and 8 are views of a further exemplary embodiment of a flow meter with a larger nominal width than the exemplary embodiment according to FIGS. 1 to 6.

FIG. 7 shows a three-dimensional illustration of an exemplary embodiment of a flow meter 1 which is designed with a larger nominal width than that of the exemplary embodiment described above. The flow meter 1 shown in FIG. 8 again has a flow channel body 2 with two connecting pieces 4, 6, into which an inlet insert 24 and an outlet insert 26 are inserted, with only the outlet insert 26 being visible in sections in the illustration shown in FIG. 7. Due to the larger nominal width, more volume is available in the area of the channel housing 16 for receiving the measuring channel insert 28 than in the exemplary embodiment described above, so that two parallel flattened areas 108 (rear side, not visible in FIG. 8) are formed on the side of the channel housing 16 to reduce the weight and to save material and, of course, also to reduce the dead volume. These two flattened areas 108 run approximately perpendicular to the flange 18 not visible in FIG. 8, on which the measuring channel insert 28 and the control housing 8 are placed. A housing cover 110 with a flap 111 is positioned above the clamping frame 12 on the control housing 8, which can be opened in order to be able to read the display of the EDU 62.

Figure 8:
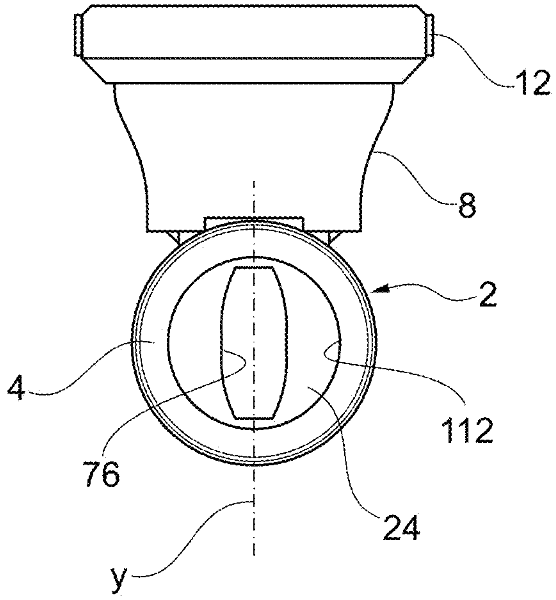

FIG. 8 shows a front view of the flow meter as shown in FIG. 7. In this illustration, the inlet insert 24 can be seen, via which the approximately circular inlet cross-section 112 is tapered to a much smaller, largely elliptical or rounded rectangular measuring channel cross-section, the vertical axis Y of which runs vertically in FIG. 8. This cross-section corresponds to the outlet-side opening profile 76 of the insert 24 and thus to the cross-section of the measuring channel.

Figure 9:
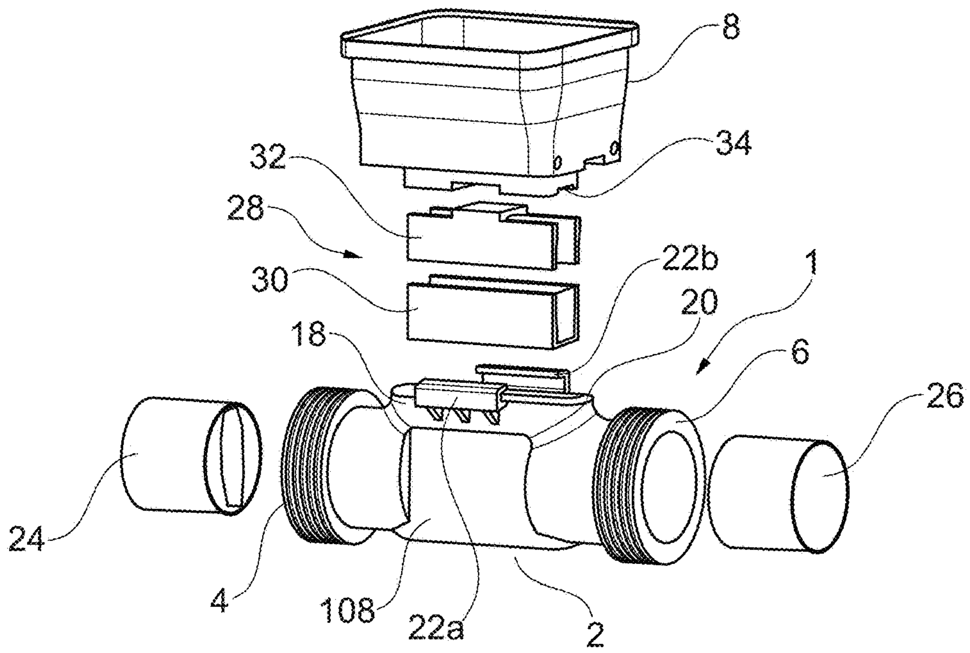
FIG. 9 is a highly simplified exploded view of the flow meter according to FIGS. 7 and 8.

FIG. 9 shows a highly simplified exploded view of the flow meter 1 according to FIGS. 7 and 8, wherein only the body 2, preferably made of brass, with the two connecting pieces 4, 6 and the two inserts 24, 26 is shown. The body 2 again has a flange 18 at the top (view according to FIG. 9), in which the recess 20 is formed. The measuring channel insert 28 including the measuring channel lower section 30, the measuring channel upper section 32 and the housing base 34 of the control housing 8 are inserted into this recess in the radial direction, the control housing then resting on the flange 18 and being fixed in position by inserting the two connecting pins 42, 44 not shown. On the body side, only two guide tabs 22*a*, 22*b* are provided on the flange 18 for this purpose, although these have a significantly greater axial length than the six guide tabs 22 of the exemplary embodiment described above, so that precise fixing of the control housing 8 and the measuring channel insert 28 is ensured. The two inserts 24, 26 and also the measuring channel insert 28 are shown in simplified form, with fewer details than in the exemplary embodiment described above.

Figure 10:
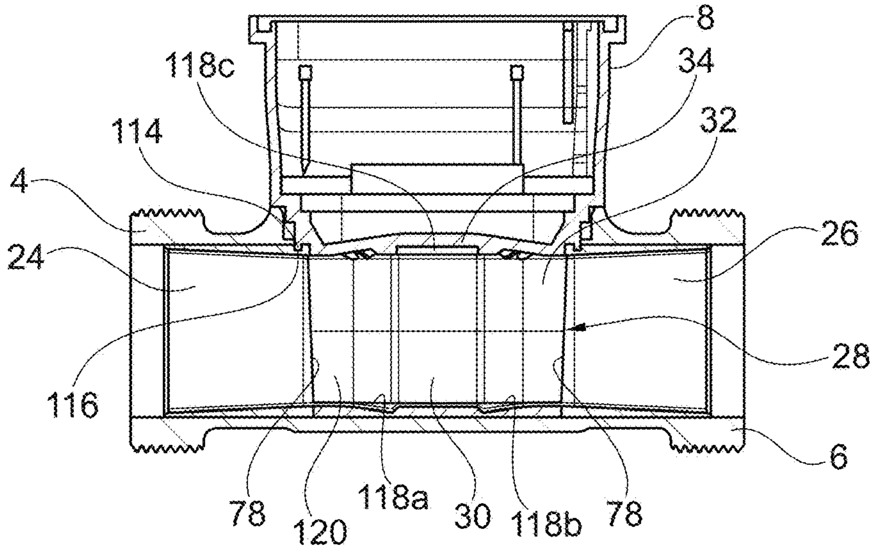
FIGS. 10, 11 and 12 show cross-sections of the flow meter according to FIGS. 7 and 8.
Figure 11:
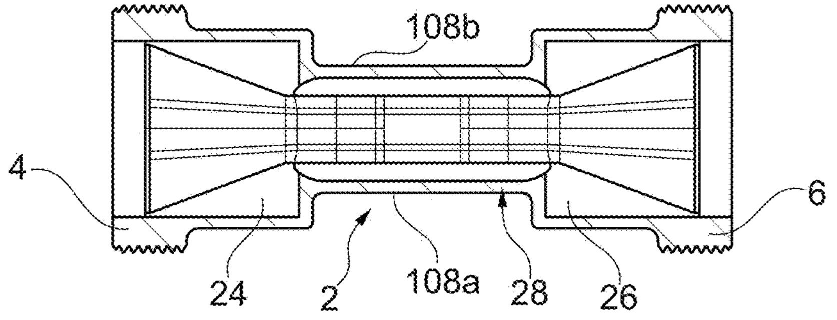

FIG. 10 shows a sectioned side view and FIG. 11 a sectioned top view of the flow meter 1 according to FIGS. 7 to 9. The sectioned side view shows the multi-part measuring channel insert 28 including the measuring channel lower section 30 and the measuring channel upper section 32, which together with the housing base 34 of the control housing 8 complement one another to form the measuring channel 120.

The two highly simplified inserts 24, 26 are already inserted in the axial direction into the two connecting pieces 4, 6 before the radial insertion of the measuring channel insert 28, the axial and radial fixation in the illustration according to FIG. 11 also taking place by a protrusion 114 of the housing base 34 moving into a recess 116 of the respective insert 24, 26 (here, only the insert 24 is provided with the reference sign 116). The positional fixation of the insert 26 is made in a corresponding manner. Of course, the position can also be fixed in accordance with the exemplary embodiment shown in FIGS. 1 to 6.

In the simplified side view in FIG. 10, the inclination of the front face 78 of the inserts 24, 26 on the measuring channel insert side can be seen quite clearly.

The sectioned side view also shows seatings 118*a*, 118*b* in the measuring channel lower section 30 and 118*c* in the measuring channel upper section 32, into which the reflectors 36 are inserted.

The top view according to FIG. 11 clearly shows the reduction in the flow cross-section within the two inserts 24, 26, wherein this reduction in cross-section takes place in such a way that there is a continuous transition into the measuring channel 120 formed by the measuring channel insert 28. The two parallel flattened areas 108*a*, 108*b*, through which the volume of the body 2 is substantially reduced, can also be seen in this illustration. As explained, the two inserts 24, 26 are fixed in position also in this exemplary embodiment by the radial insertion of the measuring channel insert 28.

Figure 12:
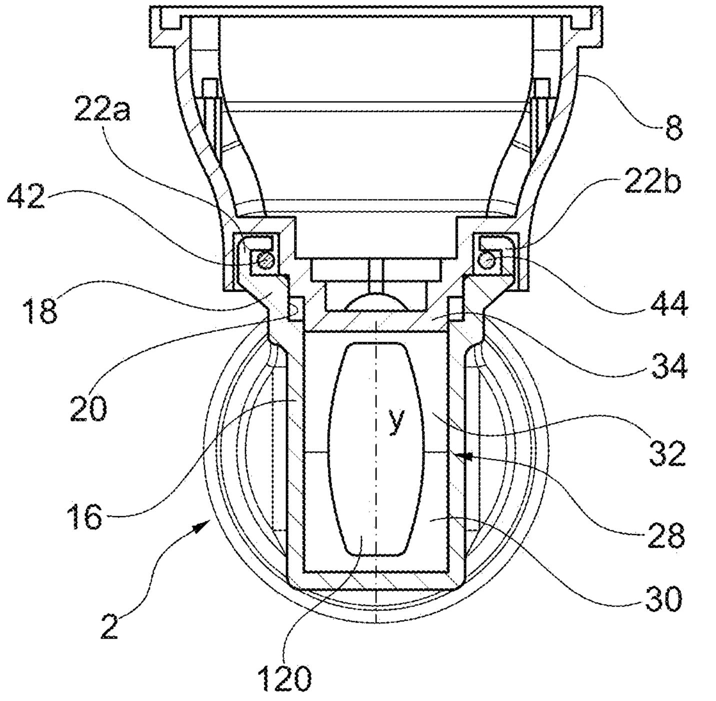

FIG. 12 shows a sectional side view of the flow meter 1, wherein, similar to the FIGS. 10 and 11, the cover of the control housing 8 is not shown. In this view, the actual measuring channel 120 can be seen, which is delimited by the measuring channel lower section 30, the measuring channel upper section 32 and the housing base 34 of the control housing 8. As explained, the recess 20 is formed in the channel housing 16 of the body and opens into the flange 18, which surrounds the housing base 34. The two guide tabs 22*a*, 22*b* are formed on the flange 18, which enter into recesses of the housing base 34 and together delimit a guide recess into which the two connecting pins 42, 44 are inserted to fix the position.

Figure 13:
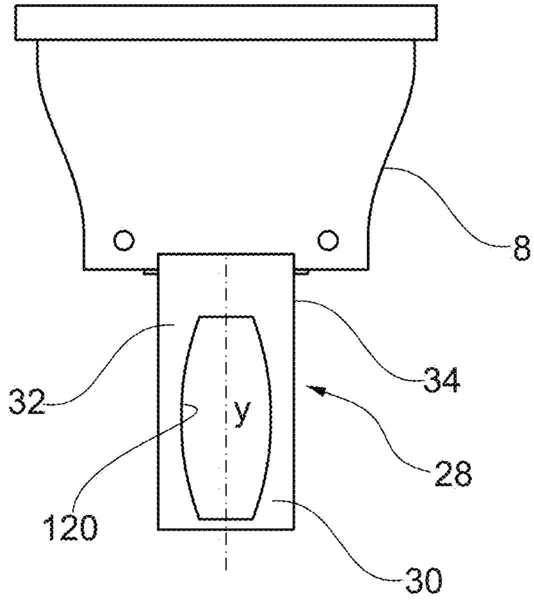
FIG. 13 is a single illustration of a measuring channel insert with a control housing of the flow meter according to FIGS. 7 to 12.

FIG. 13 shows a single illustration of the measuring channel insert 28 in a relative position before the radial insertion into the recess 20 of the body 2. As explained, the measuring channel insert 28 consists of the measuring channel lower section 30, the measuring channel upper section 32 and the housing base 34 of the control housing 8, which together delimit the ovalized measuring channel 120 formed with a vertical axis Y. The multi-part measuring channel insert 28 can be plugged together via the mating elements. In principle, however, it is also possible to form the measuring channel insert 28, optionally including the reflectors 36, by injection molding or in some other way in an integrally bonded manner. The advantage of such an integrally bonded connection of the measuring channel insert 28 and possibly the reflectors 36 with the measuring channel insert 28 is that the required tolerances can be kept much tighter than with the plug-in construction, so that the measuring channel can be manufactured more precisely with fewer irregularities.

Figure 14:
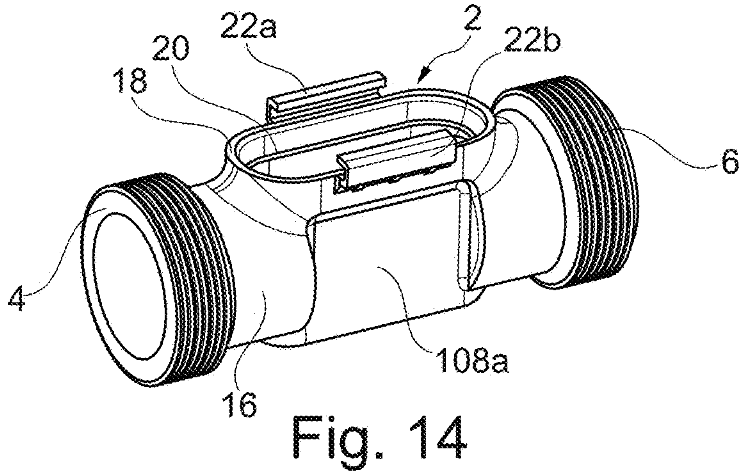
FIG. 14 is a three-dimensional illustration of a flow channel body of the second exemplary embodiment of a flow meter.
Figure 15:
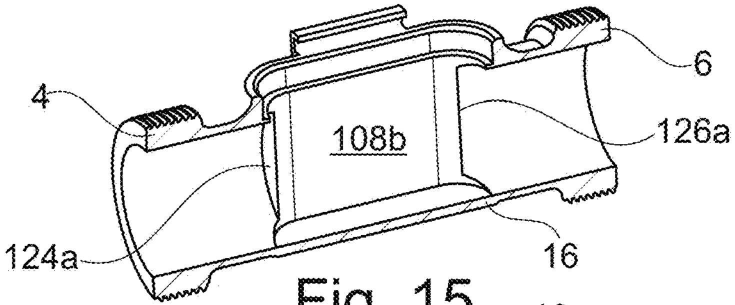
FIGS. 15, 16 and 17 are sectional views of the body according to FIG. 14.
Figure 16:
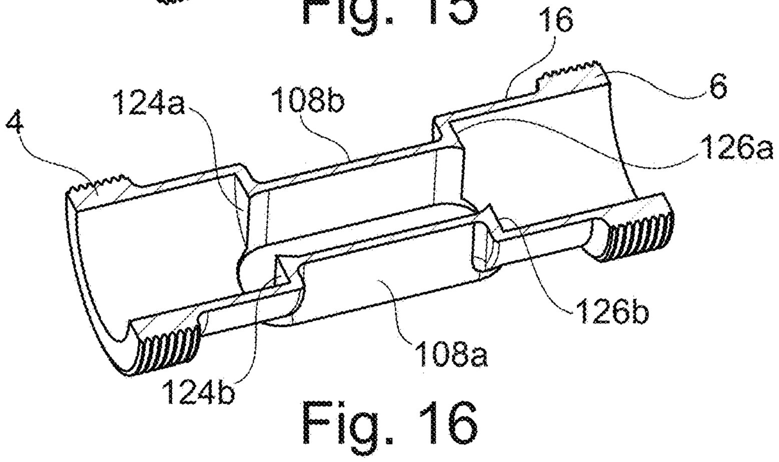
Figure 17:
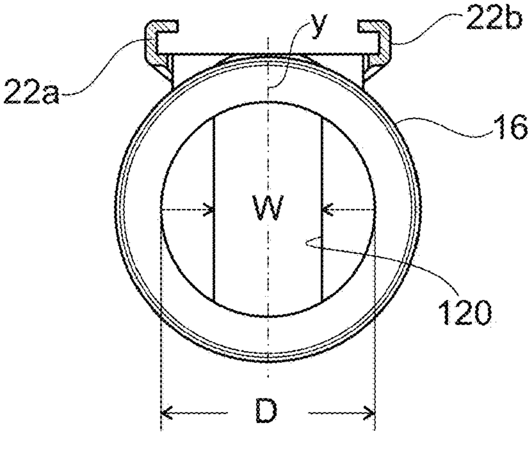

Details of the flow channel body 2 are explained below with reference to FIGS. 14 to 17. FIG. 14 shows a three-dimensional single view of the body 2. FIG. 15 shows a longitudinal section in the vertical line (based on the view in FIG. 14). FIG. 16 shows a horizontal section and FIG. 17 a cross-section of the body 2. The flow channel body 2 described has the two aforementioned flattened areas 108*a*, 108*b*, which are each formed in the area of the channel housing 16. These two flattened areas significantly reduce the clear width W (see FIG. 17) of the measuring channel 120 (transverse to the vertical axis Y) compared to the internal diameter D, so that the measuring channel 120 is also designed with a reduced volume/dead volume and thus the measuring channel insert 28 can be designed to be significantly more compact. The flange 18 described above is formed on the channel housing 16 so as to face the control housing 8 and surrounds the recess 20. Slightly offset from the two flattened areas 108*a*, 108*b* in the vertical direction, the two guide tabs 22*a*, 22*b* are formed on the flange 18 to guide the connecting pins 42, 44. The two flattened areas 108*a*, 108*b* form stop walls 124*a*, 124*b* and 126*a*, 126*b* in the transition area of the two connecting pieces 4, 6, which are spaced apart from each other and act as a stop for the inserts 24, 26, so that exact positioning during the insertion process is simplified.

Figure 18:
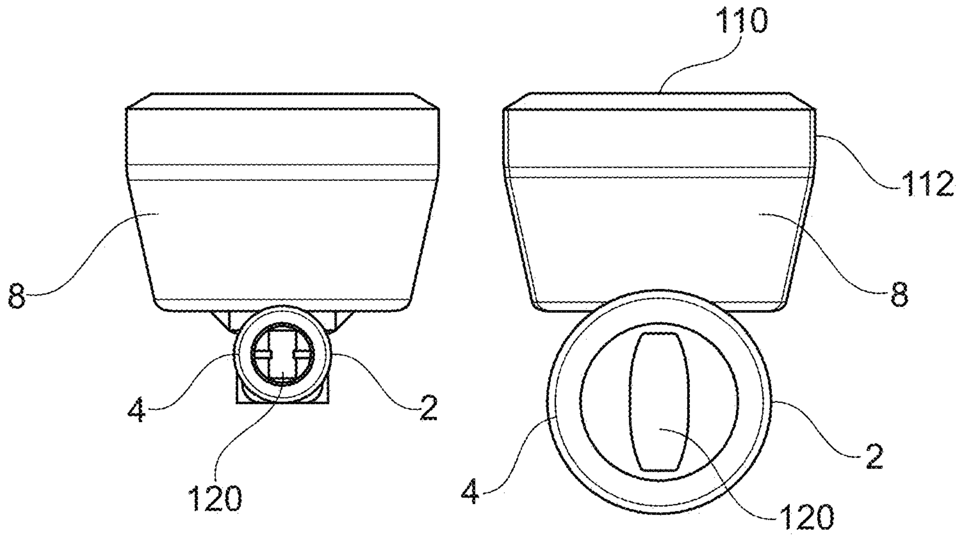
FIGS. 18 and 19 are comparative illustrations of flow meters according to the invention with different nominal widths.
Figure 19:
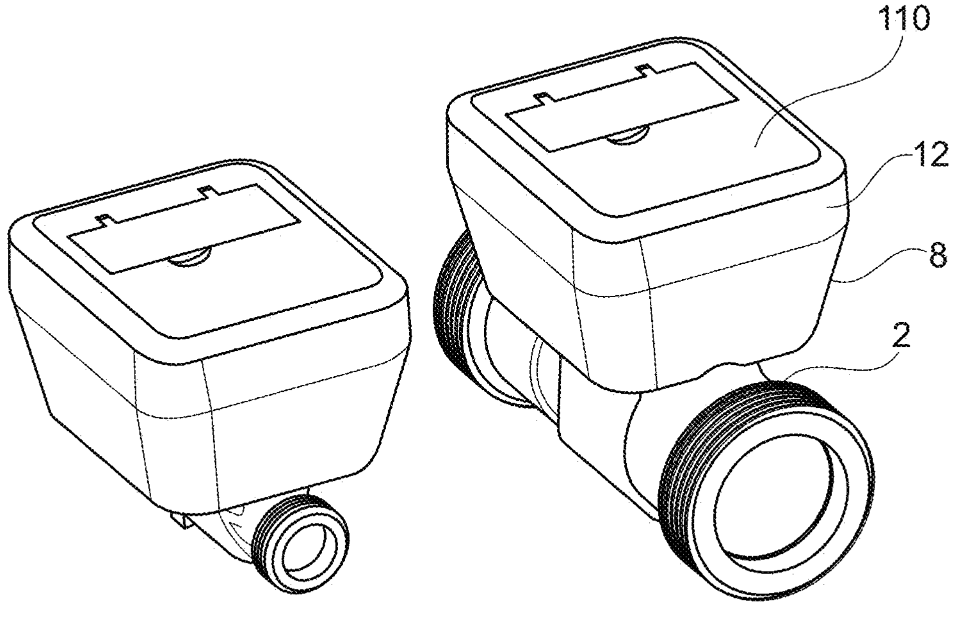

FIG. 18 shows two examples of flow meters 1 with different nominal widths. In FIG. 18, a flow meter 1 having a nominal width of DN15, for example, is shown on the left, while a flow meter 1 having a nominal width of DN40 is shown on the right. Due to the compact design of the flow channel body 2 and the multi-part or single-part measuring channel insert 28 described above, a control housing 8 with the same geometry can essentially be used for both nominal sizes, wherein in particular the housing cover 110 and the clamping frame 12, which is only indicated, may have the same design for both nominal sizes. This can also be taken from the three-dimensional illustration of this exemplary embodiment according to FIG. 19.

Figure 20:
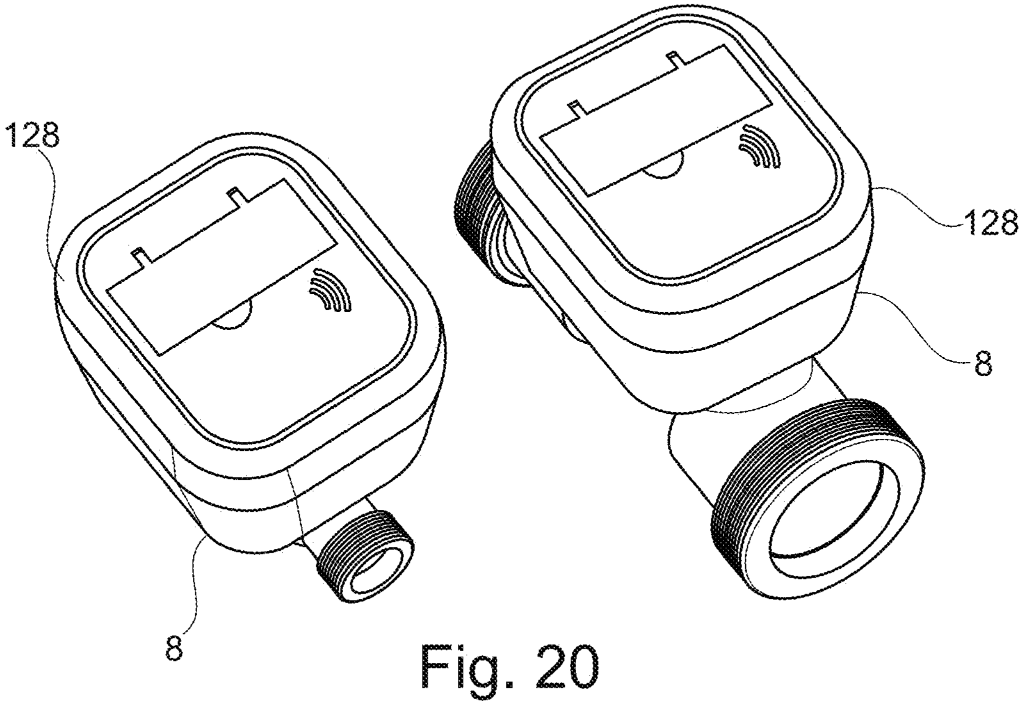
FIG. 20 are comparative illustrations of further variants of flow meters according to the invention with different nominal widths.

FIG. 20 shows variants in which the control housing 8 is designed with rounded corner areas 128 in each case. However, such a design presupposes that the main board 58 is designed with somewhat smaller dimensions than in the previously described exemplary embodiments with a more rectangular control housing cross-section.

The advantage of both designs is that approximately the same control housing geometry can be used for different nominal widths, which simplifies storage.

In the exemplary embodiments described above, the connection between the single or multi-part measuring channel insert 28 and the flow channel body 2 is made via the two connecting pins 42, 44, which alternately pass through the respective guide 46, 48 of the control housing 8 and the guide tabs 22 on the flange 18 of the body 2. In these exemplary embodiments, the guide tabs 22 do not completely surround the connecting pin 42, 44 in the circumferential direction, but are open inwards towards the recess 20, while the guides 46, 48 on the control housing side surround the connecting pin 42 or 44 on the circumferential side.

Particularly when a fluid under high pressure flows through the flow meter, these connecting areas between the control housing 8 and the body 2 are subjected to forces which, if the design is inadequate, can cause the housing base 34 of the control housing 8 to bulge and the locking elements to be subjected to considerable forces. Surprisingly, tests have shown that these forces can be absorbed better if the aforementioned guide tabs 22 open outwards, i.e. away from the flange 18 or body 2. Such an exemplary embodiment is explained with reference to FIGS. 21 to 23.

Figure 21:
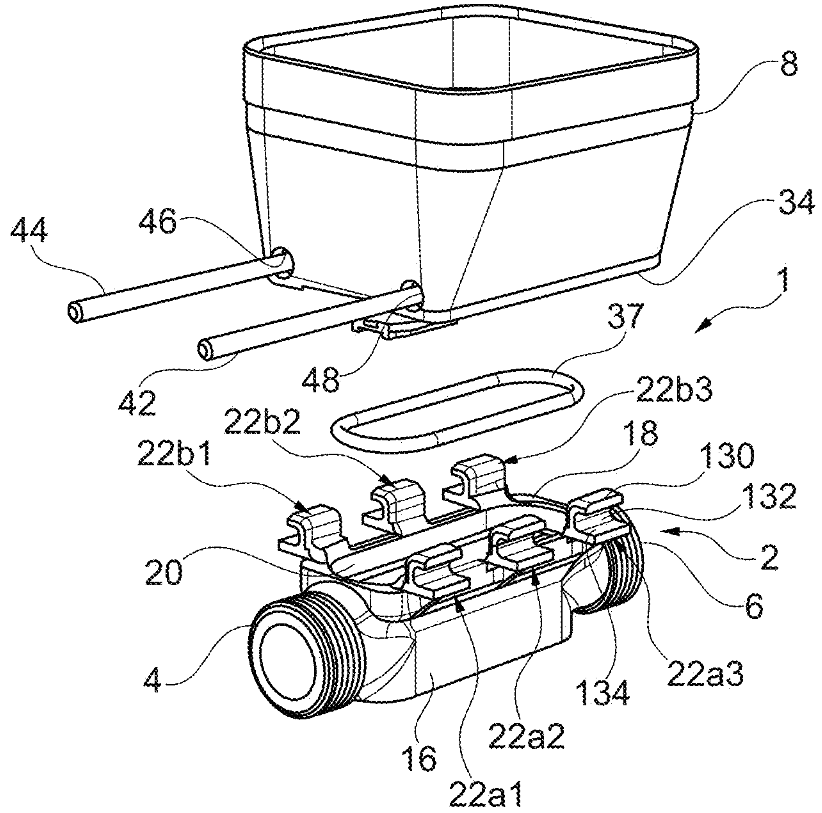
FIG. 21 is a simplified exploded view of a further exemplary embodiment of a flow meter according to the invention.

FIG. 21 shows a highly simplified exploded view of essential components of a further exemplary embodiment of a flow meter 1 according to the invention. As explained, this has a flow channel body 2 made of brass or another cast material with the two connecting pieces 4, 6 and the flange 18, which surrounds the recess 20 opening into the interior of the channel housing 16. Similar to the exemplary embodiment according to FIG. 2, three guide tabs 22*a*1, 22*a*2, 22*a*3 and 22*b*1, 22*b*2, 22*b*3 are formed on both sides of the flange 18, which are arranged coaxially to each other and each have a retaining claw 130 (only one provided with a reference sign in FIG. 21). These encompass a circumferential area of the connecting pin 42, 44 when it is inserted. Each retaining claw 130 preferably has a claw portion 132 which is slightly recessed on the circumferential side and is designed with a sliding or press fit with respect to the outer circumference of the connecting pin 42, 44, so that the latter is received in the retaining claw 130 without play. The claw portion 132 opens outwards (away from the channel housing 16) via a claw opening 134, the clear width of which is preferably equal to or slightly less than the outer diameter of the connecting pins 42, 44. This ensures a reliable guide of the connecting pins 42, 44 within the outwardly opening retaining claws 130. In the exemplary embodiments described above, these claw openings 134 are each designed to open inwards towards the recess 20.

Each of the retaining claws 130 extends into housing recesses on the housing base 34, which are explained in more detail below. As mentioned, the guides 46, 48 are formed on the control housing 8, which run coaxially to the claw portions 132 when the control housing 8/measuring channel insert 28 is inserted or mounted. As in the exemplary embodiments described above, the seal between the control housing 8 and the body 2 is provided by an O-ring seal 37.

The strength of the connection between the control housing 8 and the body 2 can be further improved—as mentioned above—if no claw opening 134 is provided, so that the retaining claws 130 each completely surround a circumferential portion of the associated connecting pin 42, 44.

Figure 22:
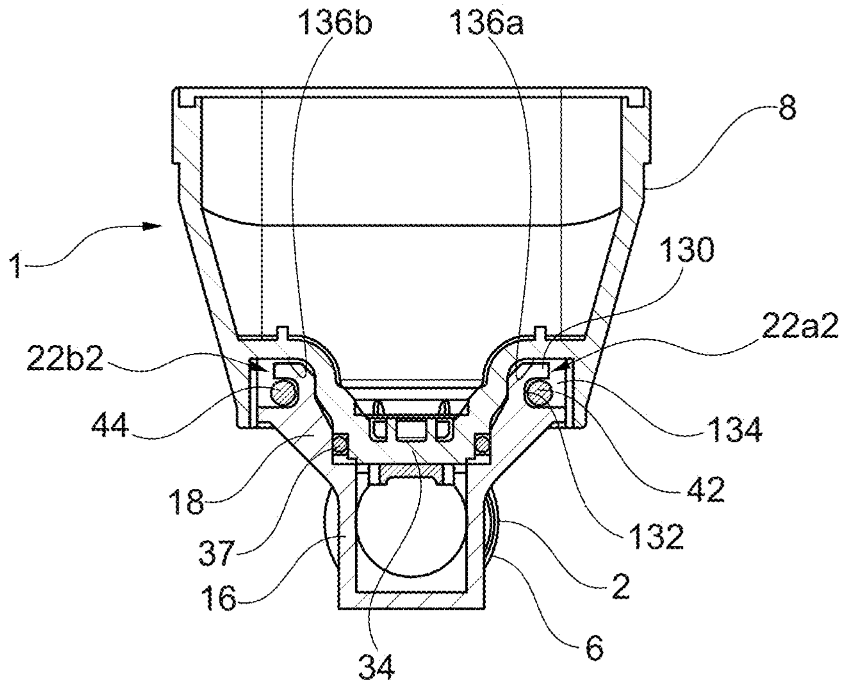
FIG. 22 shows a similarly simplified section through the flow meter according to FIG. 21.
Figure 23:
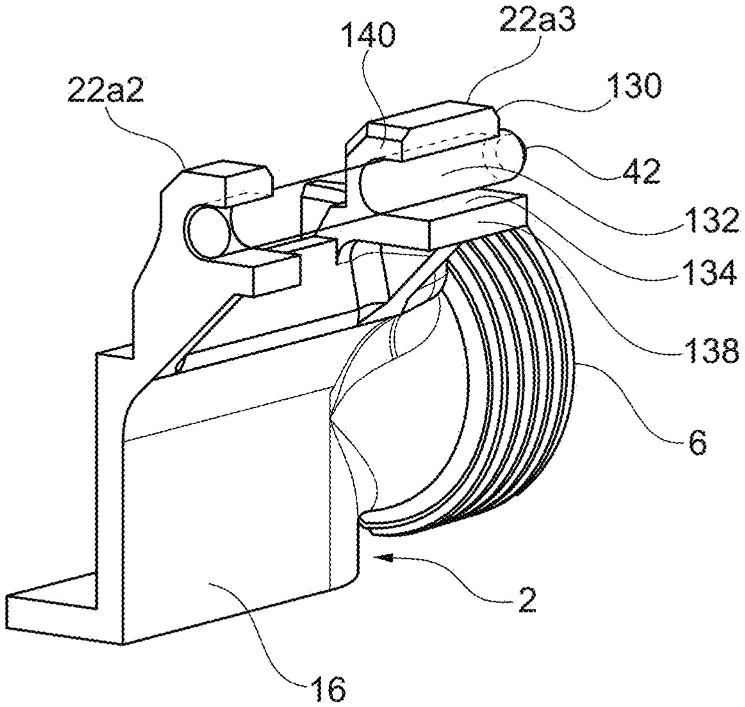
FIG. 23 is a three-dimensional partial illustration of the flow meter according to FIGS. 21 and 22.

FIG. 22 shows a longitudinal section through the arrangement according to FIG. 21 in the assembled state (with all the inserts described above, such as the control electronics, reflectors and sensors, being not shown).

The body 2 with the laterally flattened channel housing 16 formed thereon and the flange 18, from which the aforementioned guide tabs **22*a*2, 22*b*2 extend, can be seen in this illustration. FIG. 22 clearly shows the structure of the retaining claw 130, which only encompasses a circumferential portion of the respective connecting pin 42, 44. Each retaining claw 130 (in FIG. 22 only the retaining claw 130 of the guide tab 22*a*2 is provided with a reference sign) opens outwards via a claw opening 134, while the claw portion 132 embraces the respective connecting pin 42, 44 in sections. Here, the respective retaining claws 130 move into the mentioned housing recesses 136*a*, 136*b* on the housing base 34, which bulges into the recess 20 embraced by the flange 18 and which is sealed relative to the body 2 via the O-ring seal 37**.

Corresponding to the number of the retaining claws 130/guide tabs 22, corresponding housing recesses 136 are formed on the housing base 34, into each of which a retaining claw 130 is inserted. The side walls of the housing recesses 136 are each penetrated by holes/openings forming the guide 46 or 48. With such a concept, a precisely fitting and high-strength fixation of the control housing 8 on the body 2 is ensured.

Details of this fixation are explained again with reference to FIG. 23. This Figure shows a portion of the flow channel body 2 with the connecting piece 6 on the outflow side and two adjacent guide tabs **22*a*2, 22*a*3. This illustration clearly shows the retaining claw 130, which encompasses a circumferential area of the connecting pin 42 with the claw portion 132 and opens outwards towards the observer via the claw opening 134. A support area 138 of the respective retaining claw 130 is formed with a greater tangential length than a cover area 140 located at the top in FIG. 23, so that reliable positional fixing of the respective connecting pin 42, 44 is ensured. As mentioned above, the support area 138 and the cover area 140 can also be formed as a closed structure which, together with the claw portion 132, embraces the outer circumference of the connecting pin 42, 44**.

Disclosed is a flow meter with a measuring channel insert which is inserted into a flow channel body in radial direction, wherein an inlet insert and/or an outlet insert are previously inserted in axial direction.

LIST OF REFERENCE SYMBOLS

1 flow meter
2 flow channel body
4 connecting piece
6 connecting piece
8 control housing
10 glass cover
12 clamping frame
14 cover
16 channel housing
18 flange
20 recess
22 guide tab
24 insert
26 insert
28 measuring channel insert
30 measuring channel lower section
32 measuring channel upper section
34 housing base
36 reflector
37 O-ring seal
38 mating element
40 mating element
42 connecting pin
44 connecting pin
46 guide
48 guide
50 sensors
52 sensors
54 contact board
56 contact board
58 main board
60 battery
62 EDU
64 communication module
66 housing lid
68 window
69 further seal
70 main body
72 shell portion
74 converging portion
76 profile
78 front face
80 side piece
82 struts
84 locking hook
86 base
88 hook protrusion
90 locking surface
92 guiding rib
94 guiding rib
96 fixation pin
97 signal path
98 side piece groove
100 dome
102 fixation rib
104 groove wall
106 inclined surface
108 flattened area
110 housing cover
111 flap
112 inlet cross-section
114 protrusion
116 recess
118 seating
120 measuring channel
124 stop wall
126 stop wall
128 corner area
130 retaining claw
132 claw portion
134 claw opening

136 housing recess
138 support area
140 cover area

The invention claimed is:

1. A flow meter comprising:

a flow channel body that can be attached to a pipeline through which a fluid flows, the flow channel body having a fluid inlet and a fluid outlet;

a measuring unit held on the flow channel body, the measuring unit having at least two sensors, wherein the at least two sensors are spaced apart from each other and couple their measuring signals in and out through at least one recess of the flow channel body;

control electronics accommodated in a control housing and used for driving the sensors and for processing the measuring signals;

a measuring channel formed in the flow channel body at least in sections by a single-part or multi-part measuring channel insert which is inserted through the recess; and an inlet insert and an outlet insert which are inserted in the axial direction from outside in the flow channel body through the fluid inlet and fluid outlet, respectively, wherein the inlet and outlet inserts are supported in such a way that they are fixed in position by radial insertion of the measuring channel insert in the flow channel body and rest with their inner end faces against a stop wall of the flow channel body.

2. The flow meter according to claim 1, wherein the stop wall is formed by at least one radial step on the inner circumference of the flow channel body, by means of which a clear width of the measuring channel is reduced for receiving the measuring channel insert.

3. The flow meter according to claim 1, wherein each of the inlet insert and the outlet insert has a hollow main body, the inner circumference of which delimits a flow cross-section which is designed on the measuring channel insert side as an elongate or rounded, rectangular profile, wherein a locking hook projects from the hollow main body on the end face towards the measuring channel insert, a fixation rib of the measuring channel insert engaging behind the locking hook for fixing the position.

4. The flow meter according to claim 3, wherein each of the inlet insert and the outlet insert is tapered in sections towards the measuring channel insert, so that the elongate front face on the measuring channel insert side is smaller than the circular front face of the hollow main body spaced therefrom.

5. The flow meter according to claim 3, wherein the locking hook is formed in the area of a side piece projecting at the front face from the hollow main body and is cut free by a side piece groove.

6. The flow meter according to claim 3, wherein the locking hook has a locking surface set at an angle to the radial direction.

7. The flow meter according to claim 3, wherein the locking hook is arranged below a center plane of each of the inlet insert and the outlet insert or the measuring channel in the direction of insertion of the measuring channel insert.

8. The flow meter according to claim 5, wherein struts are formed on the side piece for stiffening purposes.

9. The flow meter according to claim 3, wherein a groove wall is provided on the measuring channel insert for supporting the locking hook at the rear.

10. The flow meter according to claim 1, wherein guiding ribs are arranged on the inner circumference of the inlet and outlet inserts.

11. The flow meter according to claim 1, wherein a front face of at least one of the inlet and outlet inserts on the measuring channel insert side is inclined, so that a length of the at least one of the inlet and outlet inserts on the measuring channel insert side is less than an axial length of the at least one of the inlet and outlet inserts.

12. The flow meter according to claim 1, wherein the measuring channel insert is designed in several parts with a measuring channel upper section and a measuring channel lower section, wherein the measuring channel upper section and the measuring channel lower section are attached to a housing base of the control housing and together with the housing base delimit the measuring channel circumferentially.

13. The flow meter according to claim 12, wherein reflectors are held on the measuring channel upper section and/or on the measuring channel lower section.

14. The flow meter according to claim 13, wherein the measuring channel upper section, the measuring channel lower section and at least a portion of the control housing are joined in a force-fitting or form-fitting or integrally bonded manner, before insertion into the flow channel body.

15. The flow meter according to claim 1, wherein the flow channel body has parallel flattened areas, the spacing of which is designed according to the measuring channel profile.

16. The flow meter according to claim 1, wherein the measuring channel insert and the flow channel body are connected to each other via connecting pins, which on the one hand extend through guide tabs, formed on the flow channel body side, and on the other hand extend through guides, formed on the measuring channel insert side, wherein the guide tabs have retaining claws which surround the connecting pin at least in sections and which are open so as to face away from the flow channel body or surround a portion of the connecting pin along the entire circumference.

* * * * *